United States Patent
Hannan et al.

(10) Patent No.: US 7,933,392 B1
(45) Date of Patent: Apr. 26, 2011

(54) METHOD AND SYSTEM FOR MEASURING MARKET-SHARE FOR AN ENTIRE TELECOMMUNICATION MARKET

(75) Inventors: Kevin Hannan, San Mateo, CA (US); Jerome Baccelli, Berkeley, CA (US); Ranney Fry, Sausalito, CA (US); Laura Taylor, Alameda, CA (US); Tran Thi Truong, Brookline, MA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 1294 days.

(21) Appl. No.: 11/445,069

(22) Filed: May 31, 2006

(51) Int. Cl.
*H04M 15/00* (2006.01)

(52) U.S. Cl. .............. 379/111; 379/112.01; 379/112.06; 379/112.07; 379/114.01; 705/10

(58) Field of Classification Search .................. 379/111, 379/112.01, 112.05, 112.06, 112.07, 114.01, 379/133, 134, 135.136, 201.01, 201.02, 201.05, 379/201.12, 207.04; 705/7, 8, 10; 455/405, 455/414.1
See application file for complete search history.

(56) References Cited

U.S. PATENT DOCUMENTS

| | | | |
|---|---|---|---|
| 5,661,792 A | 8/1997 | Akinpelu et al. | |
| 5,822,410 A | 10/1998 | McCausland et al. | |
| 5,903,625 A | 5/1999 | May | |
| 6,006,085 A | 12/1999 | Balachandran | |
| 6,028,914 A | 2/2000 | Lin et al. | |
| 6,049,599 A | 4/2000 | McCausland et al. | |
| 6,169,793 B1 * | 1/2001 | Godwin et al. | 379/221.13 |
| 6,169,896 B1 | 1/2001 | Sant et al. | |
| 6,192,115 B1 | 2/2001 | Toy et al. | |
| 6,301,471 B1 | 10/2001 | Dahm et al. | |
| 6,411,807 B1 | 6/2002 | Amin et al. | |
| 6,487,390 B1 | 11/2002 | Virine et al. | |
| 6,556,992 B1 | 4/2003 | Barney et al. | |

(Continued)

FOREIGN PATENT DOCUMENTS

EP    1309207    5/2003

(Continued)

OTHER PUBLICATIONS

United States Patent and Trademark Office, "Notice of Allowance," issued in connection with U.S. Appl. No. 11/486,498, on Feb. 19, 2010 (4 pages).

(Continued)

*Primary Examiner* — Binh K Tieu (74) *Attorney, Agent, or Firm* — Hanley, Flight & Zimmerman, LLC (57) ABSTRACT

A method for collecting data to measure market-share for a defined telecommunication market. A market of interest is defined and a random panel of numbers is created. A call set-up is initiated to the created random panels by generating signaling messages wherein the signaling messages access a Calling Name Services (CNAM) database, a Local Number Portability (LNP) database, an E-911 Automated Location Information (ALI) database and a Line Information Database (LIDB) using signaling system 7 (SS7) protocol. Generated signaling messages access ENUM (Telephone Number Mapping) database and Internet Protocol (IP) Peering database using IP. The response to the generated signaling messages are used to determine assignment status, business ownership, businesses versus residential status and the technology employed for a given number in the created panel. In one embodiment, the process is repeated over a period in order to determine changes to the market-share and derivative metrics for the telecommunication market.

41 Claims, 6 Drawing Sheets

U.S. PATENT DOCUMENTS

| | | | |
|---|---|---|---|
| 6,597,903 | B1 | 7/2003 | Dahm et al. |
| 6,625,269 | B1 | 9/2003 | Kim |
| 6,751,295 | B2 | 6/2004 | McCulley et al. |
| 6,754,470 | B2 | 6/2004 | Hendrickson et al. |
| 6,788,926 | B1 | 9/2004 | Frangione et al. |
| 6,832,211 | B1 | 12/2004 | Thomas et al. |
| 7,003,306 | B2 | 2/2006 | Henry-Labordere |
| 7,058,412 | B2 | 6/2006 | Lowe et al. |
| 7,139,246 | B2 | 11/2006 | Harris et al. |
| 7,248,862 | B2 | 7/2007 | Minborg et al. |
| 7,366,515 | B2 | 4/2008 | Zhao et al. |
| 7,369,865 | B2 | 5/2008 | Gabriel et al. |
| 7,599,681 | B2 | 10/2009 | Link, II et al. |
| 2002/0016731 | A1* | 2/2002 | Kupersmit ................. 705/10 |
| 2002/0023003 | A1 | 2/2002 | Raheman |
| 2002/0069037 | A1 | 6/2002 | Hendrickson et al. |
| 2002/0086671 | A1 | 7/2002 | Amin et al. |
| 2003/0023571 | A1 | 1/2003 | Barnhill |
| 2003/0061152 | A1 | 3/2003 | De et al. |
| 2003/0064722 | A1 | 4/2003 | Frangione et al. |
| 2003/0088491 | A1 | 5/2003 | Liu et al. |
| 2003/0190015 | A1 | 10/2003 | McCulley et al. |
| 2003/0200135 | A1 | 10/2003 | Wright |
| 2003/0229534 | A1* | 12/2003 | Frangione et al. ............. 705/10 |
| 2004/0097245 | A1 | 5/2004 | Sheth et al. |
| 2005/0043011 | A1 | 2/2005 | Murray et al. |
| 2005/0111640 | A1* | 5/2005 | Moisey et al. ............ 379/114.2 |
| 2005/0271029 | A1 | 12/2005 | Iffland |
| 2006/0023854 | A1* | 2/2006 | Moisan et al. ............ 379/112.1 |
| 2006/0109846 | A1 | 5/2006 | Lioy et al. |
| 2006/0135161 | A1 | 6/2006 | Jiang et al. |
| 2007/0121603 | A1 | 5/2007 | Clark, III et al. |
| 2007/0156673 | A1 | 7/2007 | Maga et al. |
| 2007/0185867 | A1 | 8/2007 | Maga et al. |
| 2008/0176535 | A1 | 7/2008 | Cai |
| 2008/0182553 | A1 | 7/2008 | Salkini et al. |
| 2008/0228557 | A1 | 9/2008 | Sepehri-Nik et al. |
| 2010/0057812 | A1* | 3/2010 | Moisan et al. ................ 707/770 |
| 2010/0074431 | A1* | 3/2010 | Enzmann et al. ........ 379/221.13 |
| 2010/0091975 | A1* | 4/2010 | Sheth et al. ............. 379/220.01 |

FOREIGN PATENT DOCUMENTS

| | | |
|---|---|---|
| WO | 9818270 | 4/1998 |
| WO | 0039981 | 7/2000 |
| WO | 0056098 | 9/2000 |
| WO | 0219625 | 3/2002 |
| WO | 02071674 | 9/2002 |
| WO | 2007081424 | 7/2007 |
| WO | 2008112352 | 9/2008 |

OTHER PUBLICATIONS

United States Patent and Trademark Office, "Notice of Abandonment," issued in connection with U.S. Appl. No. 11/527,219, on Jan. 8, 2010 (2 pages).
United States Patent and Trademark Office, "Final Office Action," issued in connection with U.S. Appl. No. 10/237,478, on Oct. 2, 2009 (22 pages).
European Patent Office, "Extended European Search Report," issued in connection with European Patent Application Serial No. 09012468.6, on Jan. 26, 2010 (6 pages).
QUALCOMM, "Handling SMS in BREW," Article retrieved from www.qualcomm.com, on Aug. 30, 2007 (3 pages).
PALM, Inc., "SMS Handbook," 2001 (24 pages).
Vougioukas et al., "A System for Basic-Level Network Fault Management Based on the GSM Short Message Service (SMS)," In: Proceedings of EUROCON'2001 International Conference on Trends in Communications, vol. 1, pp. 218-222 (5 pages).
Office Action for U.S. Appl. No. 11/486,498, issued on Apr. 3, 2009, 8 pages.
Office Action for U.S. Appl. No. 11/527,219, issued on Dec. 15, 2008, 8 pages.
Office Action for U.S. Appl. No. 10/237,478, issued on Feb. 17, 2009, 16 pages.
Office Action for U.S. Appl. No. 10/237,478, issued on Nov. 14, 2008, 3 pages.
Office Action for U.S. Appl. No. 10/237,478, issued on Sep. 12, 2008, 19 pages.
Office Action for U.S. Appl. No. 10/237,478, issued on Jan. 4, 2008, 15 pages.
Office Action for U.S. Appl. No. 10/237,478, issued on Apr. 19, 2007, 6 pages.
Office Action for U.S. Appl. No. 10/263,782, issued on May 21, 2003, 10 pages.
EP Office Action issued for EP application 03719560.9, issued on Oct. 8, 2008, 3 pages.
CN Office Action issued for CN 03812238.3, issued on Jan. 18, 2008, 11 pages.
CA Office Action issued for CA application 2,481,203, issued on Dec. 4, 2007, 3 pages.
JP Office Action issued for JP application P2003-583001, issued on Sep. 30, 2008, 4 pages.
CN Office Action issued for CN application 01816436.6, issued Dec. 9, 2005, 6 pages.
Vougioukas and Manos Rouincliotis, System for Basic Level Network Fault Mgmt based on the GSM Short Message Service (SMS), Proceedings of EUROCON'2001 International Conference on Trends in Communications vol. 1, 2001, 1 page.
Telephia acquires Mspect, Adding SMS Monitoring to Its Wireless Data QoS Solution, Business Wire, Nov. 13, 2001, 2 pages.
Galaxy Phones, Mobile Phones—The Basics, internet article, www.galaxyphones.co.uk/mobile_phones_basics07.asp, Mar. 2, 2006, 4 pages.
Call Delivery, internet article, www.members.tripod.com, retrieved from internet on Feb. 1, 2006, 1 page.
NPA-NXX, North American Numbering Plan, internet article, voip-info.org, retrieved from internet on May 12, 2008, 3 pages.
Wikipedia, Network Switching Subsystem, internet article, retrieved from the internet on Mar. 2, 2006, 6 pages.
International Bureau, International Search Report for PCT/US03/18070, Aug. 29, 2003, 5 pages.
United States Patent and Trademark Office, Office Action issued for U.S. Appl. No. 11/527,219, mailed on Jun. 24, 2009, 20 pages.
United States Patent and Trademark Office, Office Action issued for U.S. Appl. No. 11/486,498, Notification Date Nov. 4, 2009, 20 pages.
European Patent Office, Communication with European Search Report for EP Application No. 09012467.8, dated Mar. 23, 2010, 7 pages.
Patent Office of the People's Republic of China, Notification to Grant Patent Right for Invention for CN Application No. 03812238.3, issued Mar. 24, 2010, 3 pages.
Korean Intellectual Property Office, Non-Final Rejection issued for KR Application No. 10-2004-7015715, dated Nov. 10, 2009, 8 pages.
Korean Intellectual Property Office, Final Rejection issued for KR Application No. 10-2004-7015715, dated Apr. 12, 2010, 6 pages.
United States Patent and Trademark Office, Notice of Allowance issued for U.S. Appl. No. 11/486,498, mailed Apr. 20, 2010, 14 pages.

* cited by examiner

METHOD AND SYSTEM FOR MEASURING MARKET-SHARE FOR AN ENTIRE TELECOMMUNICATION MARKET

RELATED U.S. PATENT APPLICATION

This Application incorporates by reference U.S. Pat. No. 6,751,295, filed on Oct. 4, 2002, by McCulley et al., and entitled "Method and Apparatus For Measuring Communication Market Statistics," and U.S. patent Ser. No. 10/237,478, filed on Sep. 6, 2002, by Frangione et al. and entitled "Method and System for Collecting and Analyzing Market Data in a Mobile Communications System" in their entirety.

TECHNICAL FIELD

The present invention relates to the field of communication systems. More particularly, embodiments of the present invention relate to a method and system for measuring market-share for a telecommunication market.

BACKGROUND ART

The increasing competition in telecommunication markets has increased the need for competitive performance data that includes market share, subscriber counts, activation metrics and deactivation metrics. Competitive performance data can be used by companies to launch efficient marketing campaigns, to efficiently plan capital investments, or for competitive analysis to name a few. For example data on telecommunication market share (e.g., Cell Phones, Blackberries, and Personal Digital Assistant (PDA)) in a given geographical market can be invaluable to a wireless provider in order to effectively launch marketing campaigns or effectively plan for capital investment to name a few. Similarly, for landline communication companies, knowledge of market-share for a given provider is invaluable.

In other words, data collection can be used by companies to better understand the structure of their respective market and as a result understand their competitive performance. Understanding competitive performance is an integral part of virtually every business structure, enabling businesses to modify their products and services accordingly to achieve their highest possible efficiency, hence making them more competitive given their available resources. Understanding competitive performance is even more important with regards to communication service providers given the increase in number of service providers in recent years for landline and wireless services.

In order to collect data, most communication companies have relied on mostly surveys. Typically a surveyor must place a call and gather data from customers directly. Other methods for gathering data have been online surveys to collect data (e.g., Emailing Surveys or Survey through a website). As a result, most of these methods require subscribers' participation in the process.

Unfortunately this manual process is time consuming, expensive and prone to error. For example, customers are often confused about who their service provider is for a particular communication service and as a result provide the wrong information (e.g., customer may provide the name of long distance carrier as opposed to the local carrier by mistake). Moreover, this approach is prone to non-response from customers (e.g., ten customers may be called but only three may take the survey). This non-response leads to difficulties in making the response data representative on the population being surveyed. In addition, this approach is expensive and requires significant cost to reach sample sizes that provide accurate information. More importantly, the current approach does not allow communication companies to economically determine the number of added subscribers or alternatively the number of lost subscribers.

Other methods to collect data include a dial down technique where a bank of telephone operators dial line ranges assigned to a particular wireless service provider and listen to the connection of the call to determine whether a particular number has been assigned to a subscriber. This method is highlighted and described in more detail in McCulley et al. (U.S. Pat. No. 6,751,295) and hereby incorporated in its entirety by reference. Unfortunately this method is a costly and time consuming process as described in McCulley.

Other methods such as over the air (OTA) technique, described in McCulley, are more accurate and cheaper. OTA technique involves placing specialized receivers throughout a particular market to collect data. However, as discussed by McCulley, the OTA technique does not account for subscribers that use their wireless devices in case of emergency or use their wireless devices for extended periods of time away from their home market.

SUMMARY

Accordingly, a need has risen to automate the process for gathering data for competitive performance while reducing errors in collecting data. Moreover, a need has risen to collect data in a telecommunication market in its entirety without involving the subscribers. Additionally, a need has risen to collect data regarding the number of subscribers added and number of subscribers lost for a given communication company in a given market. Furthermore, there is a need for a process that is cheaper and less time consuming in addition to accounting for subscribers using wireless devices in case of emergency and away from their home market. It will become apparent to those skilled in the art after reading the detailed description of the present invention that the embodiments of the present invention satisfy the above mentioned needs.

A market of interest is defined (e.g., geographically). When the market of interest is defined, a random panel of numbers (e.g., sample of number within the market of interest) is created. Embodiments of the present invention employ two techniques, singly or in combination or any combination thereof, in order to collect data. The first technique is a network based technique where one or more databases are accessed to obtain information regarding a given number. The second technique is a signaling technique wherein a call or subset of a call is initiated and the received response is used to analyze the signal and obtain market-share information for a given number. Data collection includes but is not limited to whether a given number is assigned, the business ownership of the number (e.g., provider for that number), business versus residential status of the number and the technology employed for a given number to name a few. It is appreciated that a panel of numbers created can be wireless or landline numbers. It is further appreciated that collecting data for the selected panel of numbers over a period of time determines changes in market-share of a telecommunication market.

As a result of employing the embodiments of the present invention, the process for collecting data is automated, thereby eliminating a need to manually place a call to a given number in order to collect data. Employing the embodiments of the present invention reduce data collection errors, since a subscriber's participation in the process is no longer needed. Embodiments of the present invention remedy non-response situations by eliminating the subscriber's participation from the process. The embodiments of the present invention provide means to detect added subscribers as well as lost subscribers for a given provider in a given market. Furthermore, embodiments of the present invention provide a more cost and time efficient process in addition to accounting for subscribers using wireless devices in case of emergency and away from their home market.

One embodiment of the present invention pertains to a method of measuring market share for telecommunication market, the method includes selecting a panel of numbers for sampling a telephone network; generating signaling messages for the selected panel of numbers; sending the generated signaling messages for the selected panel of numbers to a plurality of databases and to the selected panel of numbers; receiving a response from the plurality of databases and the selected panel of numbers; and analyzing the received response from the plurality of databases and the selected panel of numbers wherein the analysis provides the market-share information for the telecommunication market.

Embodiments include the above and wherein the panel of numbers is selected geographically and/or randomly. Embodiments further include the above and wherein the panel of numbers is selected by accessing a Local Exchange Routing Guide (LERG) database. Moreover, the embodiments of the present invention include the above and wherein the panel of numbers is selected from a group consisting of wireless and landline numbers.

The embodiments also include the above and wherein the generated signaling messages access the plurality of databases wherein the plurality of databases comprise: a Calling Name Services (CNAM) database; a Local Number Portability (LNP) database; a Line Information Database (LIDB); an E-911 Automated Location Information (ALI) database; an ENUM (Telephone Number Mapping) database; and an Internet Protocol (IP) Peering database. Moreover, the embodiments include the above and wherein a signaling system 7 (SS7) protocol is used to access the CNAM, LNP, LIDB and E-911 ALI database and IP is used to access the ENUM and IP Peering database or any other databases used for call setup.

The embodiments include the above and wherein the received response from the plurality of databases and the selected panel of numbers is used to analyze the received response to determine a plurality of market share information, the plurality of market share information including: determining assignment status information of the selected panel of numbers; determining business ownership of the selected panel of numbers; determining residential versus business status of the selected panel of numbers; and determining a technology used to provide service to the selected panel of number.

Embodiments further include a computer-useable medium having computer-readable program code stored thereon for causing a computer system to execute a method for measuring market share for telecommunication market, the method including: selecting a panel of numbers for sampling a telephone network; obtaining a first set of market share information by accessing a network database; optionally obtaining a second set of market share information by initiating a call setup to the selected panel of numbers; and optionally aggregating the first set of market share information and the second set of market share information to provide a market share for the telecommunication market.

The embodiments include the above and wherein the panel of numbers is selected geographically, at random and by accessing a Local Exchange Routing Guide (LERG) database. The embodiments include the above and wherein the first set of market share information is obtained by accessing the network databases, the network databases including: a Calling Name Services (CNAM) database; a Local Number Portability (LNP) database; a Line Information Database (LIDB); and an E-911 Automated Location Information (ALI) database.

Moreover, the embodiments include the above and wherein the first set of market share information comprises: determining assignment status information of the selected panel of numbers; determining business ownership of the selected panel of numbers; determining residential versus business status of the selected panel of numbers; and determining a technology used to provide service to the selected panel of number. Furthermore, the embodiments include the above and wherein the assignment status for a wireless subscriber is determined by accessing a Calling Name Services (CNAM) database and business ownership for a wireless subscriber is determined by accessing a Local Number Portability (LNP) database and a Local Exchange Routing Guide (LERG) database.

Additionally, the embodiments include the above and wherein the business ownership for a landline subscriber is determined by accessing a Line Information Database (LIDB) and residential versus business status is determined by accessing a Calling Name Services (CNAM) database. Furthermore, the embodiments include the above and wherein the second set of market share information is obtained by initiating a call setup to the selected panel of numbers and wherein the call setup accesses a plurality of databases, the plurality of databases including: an ENUM (Telephone Number Mapping) database; a Calling Name Services (CNAM) database; and an Internet Protocol (IP) Peering database.

The embodiments also include the above and wherein the second set of market share information is used to determine residential versus business status of a landline subscriber of the selected panel of numbers and to determine the technology used for providing service to the selected panel of numbers. Moreover, the embodiments include the above and wherein the second set of market share information is used to determine assignment status of the selected panel of numbers wherein the selected panel of numbers are wireless or landline numbers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A Method and System for Measuring Market Share for an Entire Telecommunication Market An entire communications market as used herein refers to the entire market for voice and data communications. The entire communication market includes but is not limited to wireless and fixed-line communications, which can be characterized by the number and type of subscribers to communications services.

Two techniques may be employed singly or in combination or any combination thereof in order to collect data regarding subscribers in a telecommunication market. The two techniques are a network database technique and a signaling technique by initiating a call set-up or a subset of a call set-up for a given subscriber number.

A telephone call can be separated into several phases. The first phase of a call may be a call set-up. During the call set-up, the calling party and the called party may exchange information over a signaling channel. During a second phase of a call, a voice channel can be seized and the exchange of information over the voice channel between the calling party and the called party is completed.

It is appreciated that during a call set-up, information other than the network signaling channel information required to complete a call may be exchanged. For example, during a call set-up, the billing information of a party, the routing information related to the ported status of the called number or the name of the calling party may be exchanged, to name a few. Information exchanged during a call set-up, either required in completing a call or optional in completing a call, is referred to as a subset of a call set-up throughout this document. Accordingly, a call set-up or a subset of a call set-up may be used to gather information regarding the calling party or the called party. For example, a call set-up or a subset of a call set-up can be used to determine the billing information of a party. Moreover, a call set-up or a subset of a call set-up can be used to determine whether the number of the calling/called party has been ported to another carrier. Furthermore, a call set-up or a subset of a call set-up can be used to determine the name of the calling/called party. Similarly, other aspects of a call set-up or a subset of a call set-up can be used to obtain additional information for marketing purposes such as the assignment status, the ownership of a number, and determining whether a number is residential or a business number. It is appreciated that throughout this document call setup and a subset of a call setup are used interchangeably.

It is appreciated that even though the two techniques are described in a sequential manner, they may be employed in parallel to one another, singly or in combination, or any combination thereof.

Data collection may include but is not limited to determining the assignment status of a given number, determining the business ownership of a given number (e.g., the carrier that owns the number), determining business versus residential status of the number, and determining the type of technology used to name a few.

Figure 1:
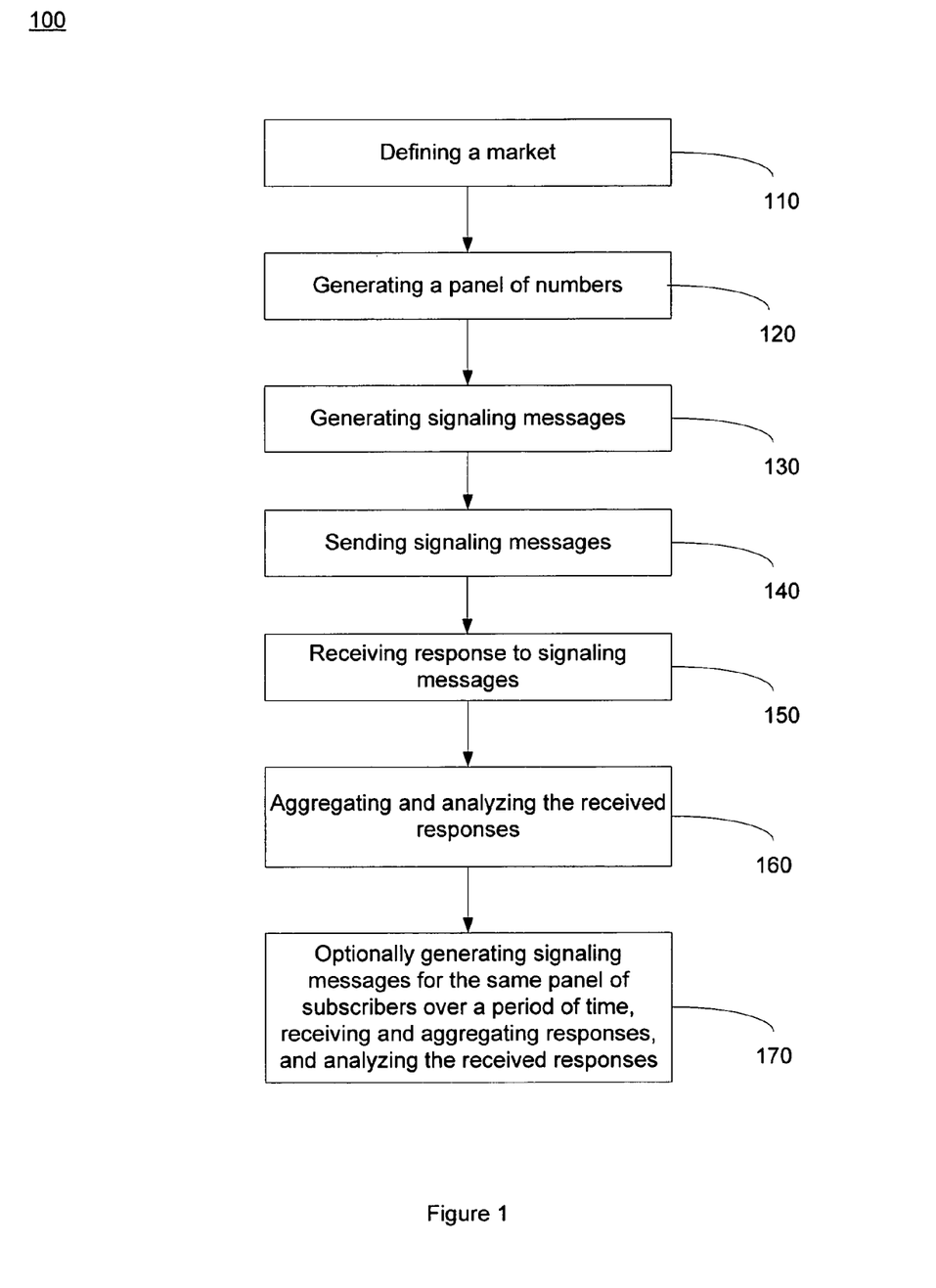
FIG. 1 shows a flow diagram of a computer implemented process for measuring market share for a telecommunication market in accordance with one embodiment of the present invention.

Referring now to FIG. 1, a flow diagram 100 of a computer implemented process for measuring market share for the entire telecommunication market in accordance with one embodiment of the present invention is shown. At step 110, the market for measuring the market share of telecommunication is defined. The market of interest may be defined in different ways. The market may be defined geographically and by the types of communication services being measured (e.g., only wireless subscriptions, only landline subscriptions or both wireless and landline subscriptions). For example a market of interest may be defined geographically where the market share for all communication devices belonging to a communication provider/carrier in a given city, county, or state is measured.

For example, for illustration purpose it is assumed that the market of interest is defined geographically. In one embodiment of the present invention, a database such as Local Exchange Routing Guide (LERG) provided by Telecordia may be used in order to provide a panel of numbers for a given carrier. LERG provides carrier information and contains information for properly routing calls to specific blocks of numbers within the North American Country Code 1 calling area. Information in LERG provides information regarding the serving carrier for a given subscriber as well as the type of service provided. Other databases similar to LERG may be used instead (e.g., a database corresponding to LERG in Europe may be used for European subscribers).

Each provider or carrier in the United States is given a set of phone numbers which the carrier can in turn assign to individual subscribers. The first six digits of each phone number are referred to as NPA-NXX. For example NPA-NXX for 415-555-0000 is 415-555. Generally, numbers given to carriers are given in two blocks (e.g., block of one thousand numbers or a block of ten thousand numbers). In this example a block of ten thousand numbers is given to each carrier.

Figure 2A:
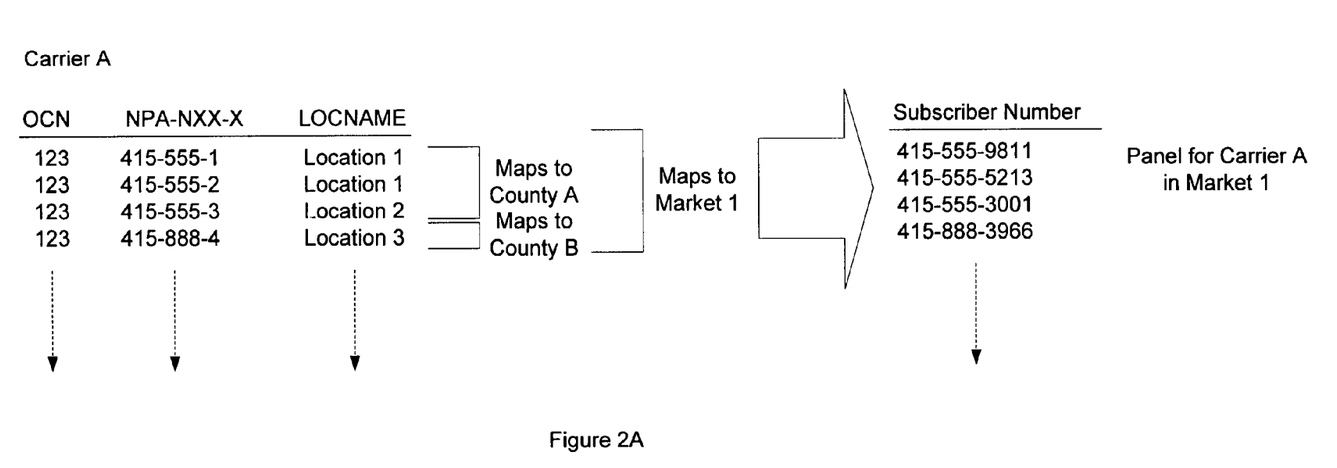
FIGS. 2A and 2B show defining and generating a panel of subscribers in accordance with one embodiment of the present invention.

Referring now to FIG. 2A, a block of ten thousand numbers is given to a given carrier (e.g., Carrier A) with the Operating Carrier Number (OCN) (e.g., OCN=123) having NPA-NXX numbers of 415-555 and 415-888 with the block of ten thousand which ranges from 0000 to 9999. Therefore, Carrier A with the OCN 123 may assign ten thousand numbers, ranging from 0000-9999 for NPA-NXX number of 415-555, to individual subscribers in different locations (e.g., Location 1 and Location 2). Location 1 and Location 2 may represent County A in a given state. Similarly, Carrier A with OCN 123 may assign the next ten thousand block of numbers ranging from 0000-9999 for NPA-NXX number of 415-888 to individual subscribers in Location 3, representing County B of a given state.

Figure 2B:
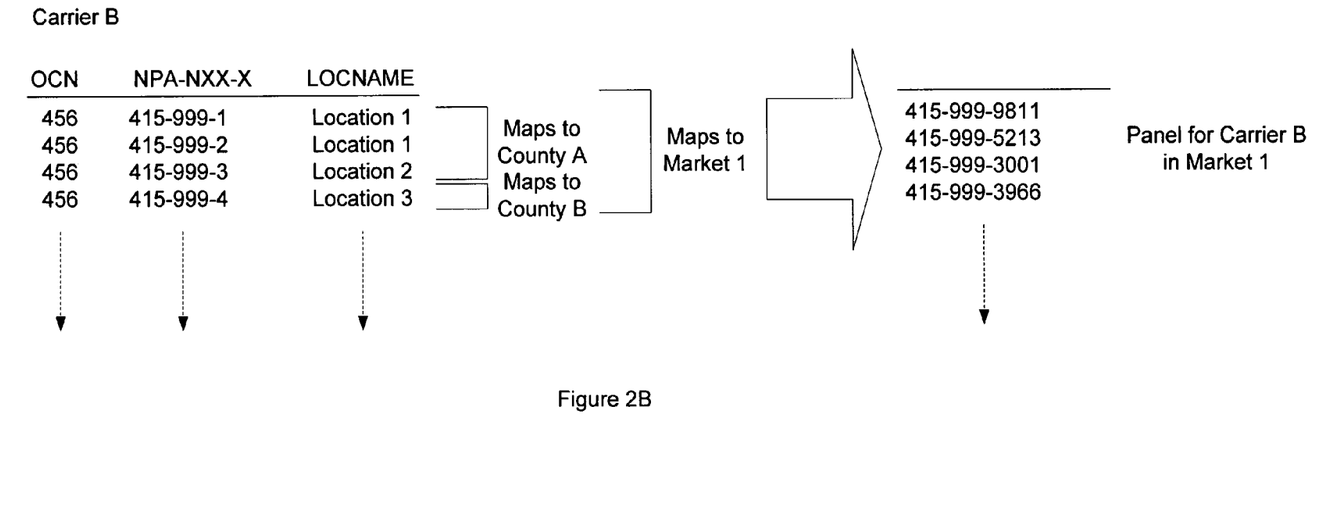

Referring now to FIG. 2B, similar to FIG. 2A Carrier B with the OCN 456 has NPA-NXX number 415-999 with the block of ten thousand which ranges from 0000-9999. Therefore, Carrier B with the OCN 456 may assign ten thousand numbers, ranging from 0000-9999 for NPA-NXX number of 415-999, to individual subscribers in different locations (e.g., Location 1, Location 2 and Location 3). Similarly, Location 1 and Location 2 may represent County A of a given state and Location 3 may represent County B of a given state.

Referring again to FIG. 1, at step 120 a panel of numbers for a defined market is generated. Accordingly, LERG database may be used in order to select a panel of numbers for a given carrier, sampling the telephone network for voice and data collection. In one embodiment of the present invention, the panel of numbers is created by taking a random sample of numbers as defined by a market at step 110.

Alternatively in one embodiment of the present invention at step 120 a panel of numbers for wireless subscribers is created by loading a control computer with ranges for all wireless service providers serving a market of interest (e.g., a city, country, area code or metropolitan area). The wireless service providers associated with a particular number is available from the North American Numbering Plan Association (NANPA) and the LERG. A desired sampling rate (e.g., 5%) is determined and a panel of numbers based on the sampling rate is created from the numbers provided by the NANPA and the LERG. The panel of numbers may be selected randomly, be predetermined or selected systematically. The process for creating a panel of numbers is described in great detail in McCulley et al. (U.S. Pat. No. 6,751,295) and is incorporated herein by reference in its entirety. It is appreciated that the process for creating panel of numbers for wireless subscribers may be extended to landline subscribers. It is also appreciated that other methods may be employed to create a panel of numbers as detailed in U.S. patent Ser. No. 10/237,478, filed on Sep. 6, 2002, by Frangoine et al. and incorporated herein by reference in its entirety.

Accordingly, a panel for Carrier A and Carrier B are generated and shown in FIGS. 2A and 2B. For example, the panel of subscribers for Carrier A in market 1 comprises subscribers with their corresponding number of 415-555-9811, 415-555-5213, 415-555-3001 and 415-888-3966 respectively. Similarly, the panel of subscribers for Carrier B in market 1 comprise of subscribers with their corresponding number of 415-999-9811, 415-999-5213, 415-999-3001 and 415-999-3966 respectively.

Referring still to FIG. 1, at step 130 after generating a panel of numbers, signaling messages are generated based on two techniques. The two techniques are a network database technique and a signaling technique to initiate a call set-up for a given number as mentioned above and as will be discussed in detail in FIGS. 3 and 4 respectively.

At step 140, generated signaling messages are sent to the numbers in order to collect data. Sending the generated signaling messages causes a response by the system. At step 150, the responses by the system to the generated signaling messages are received by the initiating device. At step 160, the received messages are analyzed and aggregated in order to provide market share information for the telecommunication market. Optionally, at step 170 in order to keep track of changes in a given market, steps 130-160 are repeated for the same panel of numbers after a period of time. Accordingly, repeating step 130-160 over a period of time tracks changes in a given market by determining deactivated subscribers, activated subscribers and other metric information, to name a few.

Figure 3:
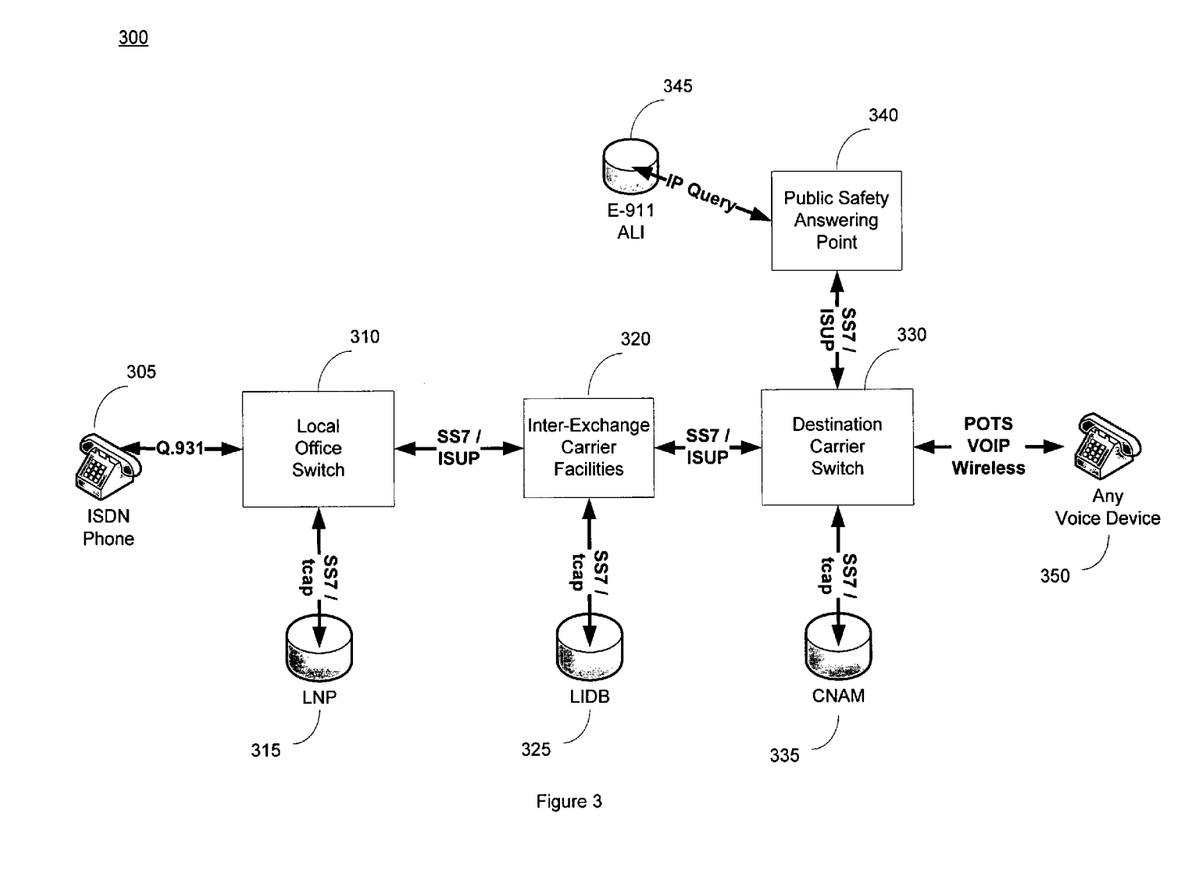
FIG. 3 shows one system embodiment for accessing a network database and initiating a call set-up to obtain market share information in accordance with one embodiment of the present invention.

Referring now to FIG. 3, one system embodiment 300 for accessing a network database and initiating a call set-up to obtain market share information in accordance with one embodiment of the present invention is shown. The system embodiment 300 shown is one system embodiment for generating, sending and receiving responses to signaling messages discussed in steps 130-150. It is appreciated that even though a telephone 305 and 350 are shown, the telephone devices 305 and 350 shown are by way of example and not limitation. As such, devices 305 and 350 may be a telecommunication device other than a telephone. For example telecommunication devices 305 and 350 may be a laptop, a personal digital assistant (PDA), a blackberry, a cellular phone, and a personal computer (PC), to name a few. It is appreciated that the network database technique uses a communication protocol referred to as Signaling System 7 (SS7).

It is also appreciated that the network database technique may use protocols other than the SS7 protocol. For example, a carrier operating a softswitch may use a Internet Protocol (IP) instead. As such, softswitch may access databases coupled to it by using the IP based connection through MTP-User Peer-to-Peer Adaptation layer (M2PA) or MTP3 User Adaptation layer (M3UA), to name a few. Accordingly, it is appreciated that the use of SS7 protocol is exemplary and should not be construed as limiting.

Circuit switched telephone networks are predominately controlled by SS7 protocol. SS7 protocol comprises various protocol layers including ISDN User Part (ISUP) which may be used in analyzing the timing and the content of the SS7 messages in order to determine the assignment status and the type of service provided for a dialed number, to name a few. It is appreciated that other layers of the SS7 protocol may be similarly used to provide additional information that may be used in determining the market share for a telecommunication market.

Data collection may be initiated by an ISDN phone 305 that is coupled to a local office switch 310 (e.g., local carrier). The local office switch 310 may contain a copy of the LERG database as described above. Initiating the data collection by the ISDN phone 305 may use a Q.931 protocol that controls ISDN circuits. The timing and the content of Q.931 may be analyzed in order to determine the assignment status and the type of service for a given number. It is appreciated that there is a corresponding subscriber for a given number if a number is determined to be assigned.

In this embodiment of the present invention, the local office switch 310 is coupled to a Local Number Portability database (LNP) 315. The local office switch 310 queries the LNP database 315 in order to determine whether the number has been ported. The query in this embodiment is based on SS7 protocol. Accordingly, if no data is returned from the LNP database 315, the subscriber's number is determined to be serviced by the carrier indicated for that number block in the LERG residing in the local office switch 310. Alternatively, if a Local Routing Number (LRN) is returned, the subscriber's number is determined to be serviced by the carrier indicated for that LRN or LRN number block indicated by the LERG. Based on previous analysis of serving carrier's services and business practices, the knowledge of the serving carrier may be sufficient for determining assignment status and other type of services provided.

Referring still to FIG. 3, the local office switch 310 is coupled to an inter-exchange carrier facility 320. The inter-exchange carrier facility 320 may be carrier A or carrier B for the market defined above. Moreover, the inter-exchange carrier facility 320 may be a carrier other than carrier A or B, which may be further coupled to a destination carrier switch 330. In this example, assuming that data is being collected for carrier A, the destination carrier switch 330 is carrier A. Similarly, if the data being collected was for carrier B, the destination carrier switch 330 would be carrier B.

In this embodiment of the present invention, the Inter-exchange carrier facility 320 is coupled to Line Information Database (LIDB) 325. During a call initiation, the inter-exchange carrier 320 may send a query to the LIDB 325 in order to determine whether the calling party is associated with a billing carrier with whom the inter-exchange 320 has a business relationship. The query is based on SS7 protocol as discussed above. The billing service provider and revenue accounting office data returned from LIDB 325 determines which carrier is billing the customer. Moreover, based on querying the LIDB 325 and the receiving responses and matching information on the serving carrier, the assignment status and other types of services offered may be determined for a given subscriber.

Referring still to FIG. 3, the destination carrier switch 330 is coupled to a Calling Name Database (CNAM) 335. During the call initiation, the destination switch 330 sends a query to the CNAM 335 in order to determine the calling name information stored for the calling party. When the CNAM 335 database is accessed, the information regarding the subscriber is returned to the initiating party. As such, a determination may be made regarding the type of services associated the subscriber number. For example, the CNAM 335 response may be "Smith, Janet." Accordingly, the subscriber may be assumed to be associated with residential services. When the response from CNAM 335 is matched to that of the serving carrier, the assignment status may be determined. For example, some carriers may only return a CNAM response for assigned numbers. As such, the assignment status of a number associated with a subscriber may be determined.

The destination carrier switch 330 may also be coupled to a public safety answering point (PSAP) 340 which routes and is connected for emergency services such as contacting 911 operators. The PSAP 340 may be coupled to an E-911 automated location information (ALI) 345 database. In this embodiment, the PSAP 340 queries the E-911 ALI 345 database using internet protocol (IP). During the call initiation the PSAP 340 receives the calling party's number, either via Dual Tone Multi-frequency (DTMF) or using SS7 protocol. When the PSAP 340 conducts a query of the E-911 ALI 345 database, it determines detail information about the subscriber, including precise location, billed subscriber's name, and billing service provider. As such, this information may be used to determine whether a subscriber number is in service, the type of service and the billing service provider.

Referring still to FIG. 3, the destination carrier switch 330 may be coupled to the subscriber 350 (e.g., a telephone subscriber, wireless subscriber, blackberry user, PDA user, laptop user, or a pager user). Coupling of the destination carrier switch 330 to the subscriber 350 may use plain old telephone services, voice over IP (VOIP), or wireless services, to name a few.

Figure 4:
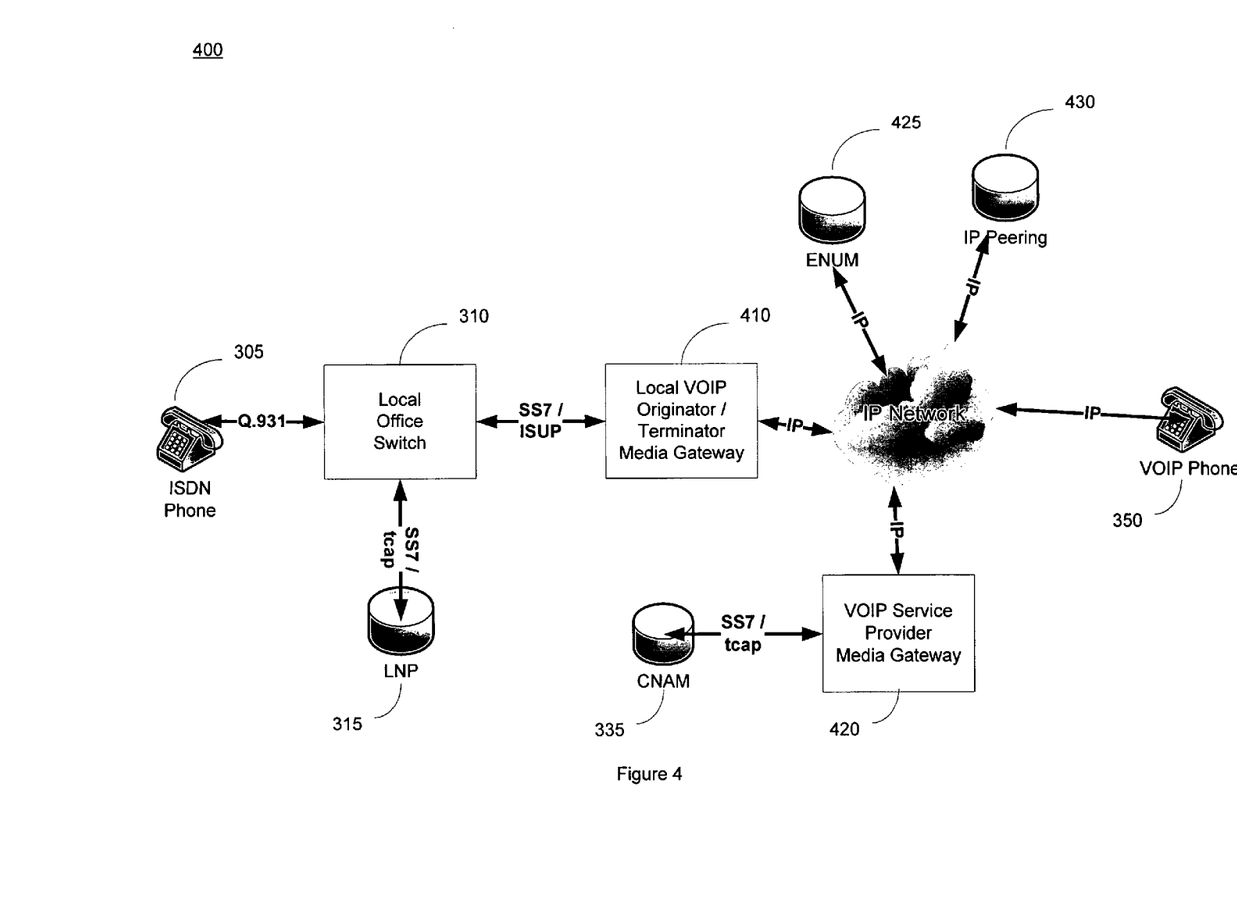
FIG. 4 shows one system embodiment for obtaining market share information using a signaling technique in accordance with one embodiment of the present invention.

Referring now to FIG. 4, one system embodiment 400 for obtaining market share information using a signaling technique in accordance with one embodiment of the present invention is shown. The system embodiment 400 shown is one system embodiment for generating, sending and receiving response to signaling messages discussed in steps 130-150. It is appreciated that even though a telephone 305 and 350 are shown, the telephone devices 305 and 350 shown are by way of example and not limitation. As such, devices 305 and 350 may be a telecommunication device other than a telephone (e.g., a laptop, personal digital assistant (PDA), blackberry, cellular phone, personal computer (PC), pager and facsimile).

Similar to before, the call is initiated by the ISDN phone 305 as described above and a signal is sent to the local office switch 310 using Q.931 protocol. As discussed above, the local office switch 310 is coupled to the LNP 315 database and obtains the serving carrier's information as well as assignment status and other types of services provided.

The signal initiated by the ISDN phone 305 is sent to a local VOIP originator/terminator media gateway 410 using SS7/ISUP protocol. The local VOIP originator 410 transforms the inquiry from SS7/ISUP protocol to IP. The local VOIP originator 410 is coupled to IP network which is further coupled to a VOIP service provider media gateway 420. The VOIP service provider 420 is the service provider for the subscriber and is coupled to the CNAM 335 database as discussed above. The packet based telephone networks, using technologies such as VOIP does not relay on the circuit switched for routing calls (e.g., SS7).

Referring still to FIG. 4, the IP network is further coupled to a Telephone Number Mapping (ENUM) 425 and IP Peering database 430. The ENUM 425 database may be used to map the called subscriber number to a Uniform Resource Locator (URL) of the Internet. Accordingly, analyzing a response from the ENUM 425 database may be used to determine the assignment status and the billing service provider.

Similarly, the IP Peering database 430 may be used to map the called subscriber's number to a URL of the Internet. Accordingly, analyzing a response from the IP Peering database 430 may be used to determine the assignment status and the billing service provider.

In one embodiment of the present invention, the two systems introduced and discussed in FIGS. 3 and 4 may be combined in order to obtain market share information using the signaling technique as well as using the network database technique to obtain market share information. It is appreciated that the use of a specific database to obtain a given market share information (e.g., assignment status, residential versus business, and etc.) is for illustration purposes and should not be construed as limiting. As such, other databases and similar techniques may be used in order to obtain the same information and are now obvious to one ordinary skilled in the art in light of the description above.

Figure 5:
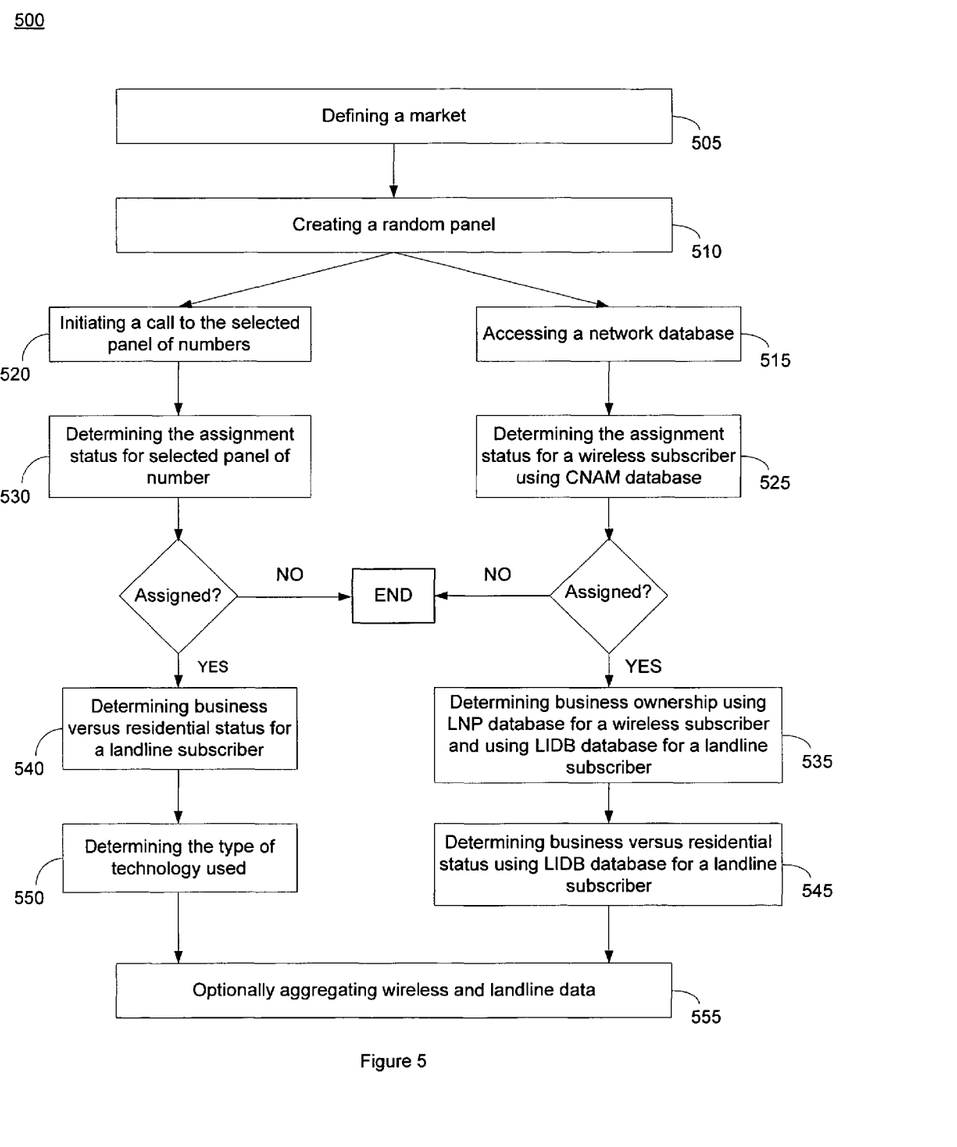
FIG. 5 shows a flow diagram of a computer implemented process for measuring market share for a telecommunications market in accordance with one embodiment of the present invention.

Referring now to FIG. 5, a flow diagram 500 of a computer implemented process for one embodiment of the present invention for measuring market share for a telecommunication market is shown. At step 505, a market of interest is defined as described above.

When the market of interest is defined, at step 510 a panel of numbers is created to represent a market defined. It is noted that creating a panel of numbers is used synonymously with selecting a panel of numbers throughout this document. For example, if a market of interest is defined geographically, the panel of numbers is selected geographically. In one embodiment of the present invention, the panel of numbers is selected randomly for a given geographical area. A random panel of subscribers is generated at step 510 as described above.

For network database technique, at step 515 the network database is accessed in order to collect data for a given number within the selected random panel of numbers. The network database used may be a database which may contain information for a number within the selected random panel of numbers. In one embodiment of the present invention, the SS7 protocol is used to query the LNP database 315, the LIDB 325 and the CNAM database 335, to name a few as discussed above.

At step 525, the assignment status for a wireless number is determined. In other words, at step 525 it is determined whether the number is assigned to a subscriber. Additional information is also gathered at this step that aids in determining the business owner of the number and whether a number is business or residential. Upon determining that a given number is not assigned, the process ends. However, in other embodiments of the present invention the process may continue. The reason for terminating the process upon determining that a number is not assigned is that if a number is not assigned, then there is no corresponding subscriber for that number and therefore the number is not used for either business or residential purposes. Moreover, if a number is not assigned, determining business ownership of the number does not affect carrier's market share. However, in other embodiments the process may continue for other reasons.

To determine the assignment status of a wireless telephone number the CNAM database 335 may be used. The CNAM 335 database may be accessed through a third party or the CNAM information may be contained in the signal information received in the call set-up transaction. The CNAM database 335 is the database used for providing Caller Identification information. Accordingly, the assignment status of a wireless number can be determined using the CNAM 335 database.

At step 535, business ownership of a given number within the selected panel of numbers is determined through the previously captured signaling information and through accessing the databases discussed above by using SS7 protocol. In one embodiment of the present invention, the signaling technique is used to determine whether the number has been ported through LNP 315. If a number has been ported, the signaling information will indicate to which carrier the number has been ported (by way of the owner of the LNP Local Routing Number). In addition, the method determines whether the number has been resold by accessing the information in the LIDB 325 database, either through a call set-up transaction or through accessing the LIDB 325 through a third party.

At step 545, business versus residential status of a landline subscriber is determined. In one embodiment of the present invention the CNAM 335 database and signaling information are used to determine business versus residential status of a landline subscriber. As discussed above, the CNAM 335 database is a database used to provide caller identification information. By application of algorithms that analyze the signaling information and the CNAM information, the business versus residential status of a number can be determined.

It is appreciated that even though steps 525, 535 and 545 were described in a sequential manner, these steps may be implemented in a different sequence. For example, steps 525, 535 and 545 may be implemented simultaneously, i.e., in parallel. Moreover, it is appreciated that steps 525, 535 and 545 may be implemented singly, or in combination thereof, completely in sequential manner or partly in sequential manner, or in parallel or any other combination thereof.

At step 520, a call set-up is initiated to the selected panel of numbers created in step 510. At step 520, when a call set-up is initiated, the response signal back from the network related to placing the call is detected and analyzed by algorithms, which can be used to determine the assignment status of a number within the selected panel of numbers created in step 530. It is appreciated that determining the assignment status in step 530 may be used for wireless as well as landline numbers. As discussed above, in one embodiment of the present invention upon determining that a number is not assigned the process terminates. However, as discussed above, in other embodiments of the present invention the process may continue. The reason for terminating the process upon determining that a number is not assigned is that if a number is not assigned, then there is no corresponding subscriber for that number. As such, the number is not used for either business or residential purposes. Moreover, if a number is not assigned, determining business ownership of the number does not affect carrier's market share. However, in other embodiments the process may continue for other reasons. Assignment status of a landline number may include information such as whether the number is assigned, unassigned, active or inactive.

When the assignment status of a landline number is determined, at step 540 the signaling technique is used to determine whether the landline number is a residential or a business number. Moreover, the signaling technique may be used at step 550 in order to provide information regarding the type of technology used for a given landline number (e.g., Voice Over Internet Protocol (VOIP)).

It is appreciated that even though steps 530, 540 and 550 were described in a sequential manner, these steps may be implemented in a different sequence. For example, steps 530, 540 and 550 may be implemented simultaneously, i.e., in parallel. Moreover, it is appreciated that steps 530, 540 and 550 may be implemented singly, or in combination thereof, completely in sequential manner or partly in sequential manner, or in parallel or any other combination thereof.

Optionally, at step 555 data collected from the signaling technique and the network base technique may be aggregated in order to measure a market share for the defined telecommunication market. It is appreciated that some of the voice and data collected may overlap from the two techniques. In order to eliminate the overlap between wireless and landline or overlap between household/company and individual subscribers various methods may be employed. For example, the overlap may be eliminated through a phone survey. Alternatively, an algorithm detecting the overlap may be implemented to eliminate the overlap between the two techniques used. Optionally, steps 515-545 and 520-550 may be repeated for the selected panel of numbers over a period of time in order to determine the changes in a defined telecommunication market (e.g., added subscribers, lost subscribers and etc.).

It is appreciated that the sequence of steps described in FIGS. 1 and 5 may be in orders other than the one presented. As such, the sequence of steps presented are not to be construed as limiting but as exemplary method of implementation in accordance with one embodiment of the present invention.

As a result of employing the embodiments of the present invention the process for collecting data is automated, thereby eliminating a need to manually placing a call to a given number to collect data. Moreover, employing the embodiments of the present invention reduce data collection errors since subscriber's participation in the process is no longer needed. Additionally, embodiments of the present invention remedy non-response situation by eliminating the subscriber's participation from the process. The embodiments of the present invention provide means to detect added subscribers as well as lost subscribers for a given provider in a given market.

Figure 6:
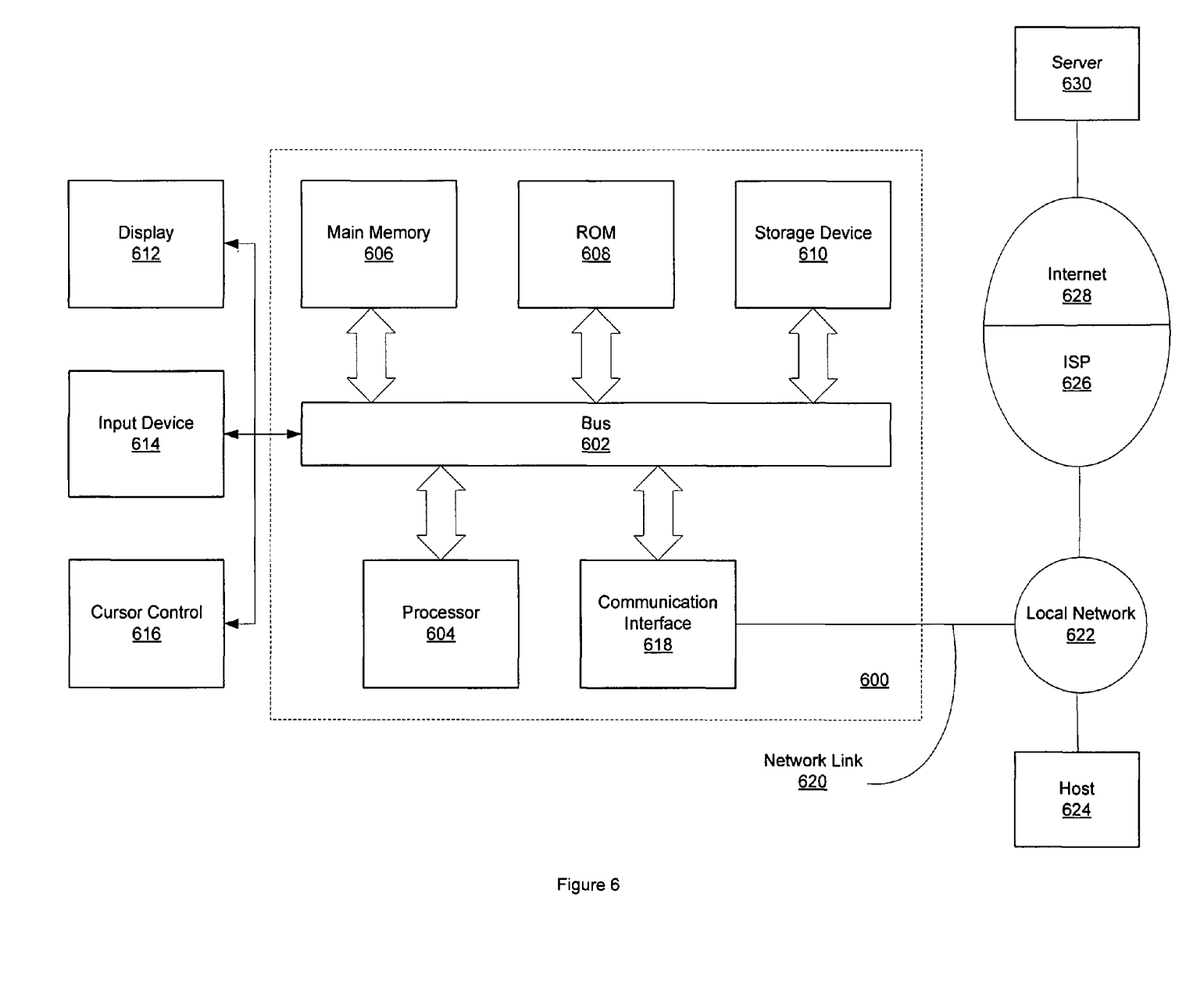
FIG. 6 illustrates a general purpose computer system that may serve as a platform for embodiments of the present invention.

FIG. 6 is a block diagram that illustrates a computer system 600 upon which an embodiment of the invention may be implemented. Computer system 600 may implement the method for measuring market share for a telecommunication market as shown in FIGS. 1-5 and includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A non-volatile storage device 610, such as a magnetic disk or optical disk, is provided and coupled to bus 602 for storing information and instructions and may store the persistent internal queue.

Computer system 600 may be coupled via bus 602 to an optional display 612, such as a cathode ray tube (CRT), for displaying information to a computer user. An optional input device 614, including alphanumeric and other keys, may be coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612.

The invention is related to the use of computer system 600 for measuring market share for the entire telecommunication market. According to one embodiment of the invention, the interface is used in response to processor 604 executing one or more sequences of one or more instructions contained in main memory 606 e.g., to implement process 100 and 500. Such instructions may be read into main memory 606 from another computer readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of carrier waves transporting the information.

Computer system 600 can send and receive messages through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of measuring market share for a telecommunication market, said method comprising:
   selecting a telephone number (TN) from a panel of numbers for sampling a telephone network;
   obtaining market information associated with the TN by initiating a call setup and accessing a plurality of databases to identify a first carrier of the TN;
   querying a local number portability (LNP) database with the TN to identify a porting status;
   associating the TN with a second carrier when the query returns a local routing number (LRN), or associating the TN with the first carrier when the query does not return the LRN; and
   processing said market information to provide market share information for said telecommunication market.

2. The method as described in claim 1 wherein said panel of numbers is selected geographically.

3. The method as described in claim 1 wherein selecting said panel of numbers is random.

4. The method as described in claim 1 wherein said panel of numbers is selected by accessing a Local Exchange Routing Guide (LERG) database.

5. The method as described in claim 1 wherein said market information is obtained by accessing said plurality of databases, said plurality of databases comprising at least one of:
   a Calling Name Services (CNAM) database,
   the Local Number Portability (LNP) database,
   a Line Information Database (LIDB) or
   an E-911 Automated Location Information (ALI) database.

6. The method as described in claim 1 wherein said market information comprises:
   determining said assignment status information of said selected panel of numbers;
   determining business ownership of said selected panel of numbers;
   determining residential versus business status of said selected panel of numbers; and
   determining a technology used to provide service to said selected panel of numbers.

7. The method as described in claim 5 wherein said assignment status for a wireless subscriber is determined by:
   accessing the CNAM database;
   accessing the LNP database to identify said assignment status when said assignment status is absent from the CNAM database;
   accessing the LIDB to identify said assignment status when said assignment status is absent from the LNP database; and
   accessing the ALI database to identify said assignment status when said assignment status is absent from said LIDB.

8. The method as described in claim 6, wherein said business ownership for a wireless subscriber is determined by accessing a Local Number Portability (LNP) database and a Local Exchange Routing Guide (LERG) database.

9. The method as described in claim 6, wherein said business ownership for a landline subscriber is determined by accessing a Line Information Database (LIDB).

10. The method as described in claim 6, wherein determining residential versus business status for a landline subscriber of said selected panel of numbers is determined by:
    accessing a Calling Name Services (CNAM) database; and
    accessing a Local Number Portability database to determine residential versus business status when said status is absent from the CNAM database.

11. The method as described in claim 1 wherein said market information is obtained by sequentially accessing said plurality of databases, said plurality of databases comprising:
    an ENUM (Telephone Number Mapping) database;
    a Calling Name Services (CNAM) database; and
    an Internet Protocol (IP) Peering database.

12. A computer-useable medium having computer-readable program code stored thereon for causing a computer system to execute a method for measuring market share for a telecommunication market, said method comprising:
    selecting a telephone number (TN) from a panel of numbers for sampling a telephone network;
    obtaining market information associated with the TN by initiating a call setup and accessing a plurality of databases to identify a first carrier of the TN;
    querying a local number portability (LNP) database with the TN to identify a porting status;
    associating the TN with a second carrier when the query returns a local routing number (LRN), or associating the TN with the first carrier when the query does not return the LRN; and
    processing said market information to provide market share information for said telecommunication market.

13. The computer useable medium as described in claim 12 wherein said panel of numbers is selected geographically.

14. The computer useable medium as described in claim 12 wherein selecting said panel of numbers is random.

15. The computer useable medium as described in claim 12 wherein said panel of numbers is selected by accessing a Local Exchange Routing Guide (LERG) database.

16. The computer useable medium as described in claim 12 wherein said market information is obtained by said sequentially accessing said plurality of databases, said plurality of databases comprising at least one of
    a Calling Name Services (CNAM) database,
    a Local Number Portability (LNP) database,
    a Line Information Database (LIDB) or
    an E-911 Automated Location Information (ALI) database.

17. The computer useable medium as described in claim 12 wherein said market information comprises:

determining said assignment status information of said selected panel of numbers;

determining business ownership of said selected panel of numbers;

determining residential versus business status of said selected panel of numbers; and determining a technology used to provide service to said selected panel of number.

18. The computer useable medium as described in claim 16 wherein said assignment status for a wireless subscriber is determined by:

accessing the CNAM database;

accessing the LNP database to identify said assignment status when said assignment status is absent from the CNAM database;

accessing the LIDB to identify said assignment status when said assignment status is absent from the LNP database; and accessing the ALI database to identify said assignment status when said assignment status is absent from said LIDB.

19. The computer useable medium as described in claim 17, wherein said business ownership for a wireless subscriber is determined by accessing a Local Number Portability (LNP) database and a Local Exchange Routing Guide (LERG) database.

20. The computer useable medium as described in claim 17, wherein said business ownership for a landline subscriber is determined by accessing a Line Information Database (LIDB).

21. The computer useable medium as described in claim 17, wherein determining residential versus business status for a landline subscriber of said selected panel of numbers is determined by:

accessing a Calling Name Services (CNAM) database; and accessing the Local Number Portability database to determine residential versus business status when said status is absent from the CNAM database.

22. The computer useable medium as described in claim 12 wherein said market information is obtained by said accessing said pluralityy of databases, said plurality of databases comprising:

an ENUM (Telephone Number Mapping) database;

a Calling Name Services (CNAM) database; and an Internet Protocol (IP) Peering database.

23. A computer system comprising a processor coupled to a bus and a memory coupled to said bus, wherein said memory comprises instructions that when executed on said processor implement a method for measuring market share for a telecommunication market, said method comprising:

selecting a telephone number (TN) from a panel of numbers for sampling a telephone network;

obtaining market information associated with the TN by initiating a call setup and accessing a plurality of databases to identify a first carrier of the TN;

querying a local number portability (LNP) database with the TN to identify a porting status;

associating the TN with a second carrier when the query returns a local routing number (LRN), or associating the TN with the first carrier when the query does not return the LRN; and processing said market information to provide market share information for said telecommunication market.

24. The computer system as described in claim 23 wherein said panel of numbers is selected geographically.

25. The computer system as described in claim 23 wherein selecting said panel of numbers is random.

26. The computer system as described in claim 23 wherein said panel of numbers is selected by accessing a Local Exchange Routing Guide (LERG) database.

27. The computer system as described in claim 23 wherein said market information is obtained by said sequentially accessing said plurality of databases, said plurality of databases comprising:

a Calling Name Services (CNAM) database;

the LNP database;

a Line Information Database (LIDB); and an E-911 Automated Location Information (ALI) database.

28. The computer system as described in claim 23 wherein said market information comprises:

determining said assignment status information of said selected panel of numbers;

determining business ownership of said selected panel of numbers;

determining residential versus business status of said selected panel of numbers; and determining a technology used to provide service to said selected panel of number.

29. The computer system as described in claim 23 wherein said assignment status for a wireless subscriber is determined by:

accessing the CNAM database;

accessing the LNP database to identify said assignment status when said assignment status is absent from the CNAM database;

accessing the LIDB to identify said assignment status when said assignment status is absent from the LNP database; and accessing the ALI database to identify said assignment status when said assignment status is absent from said LIDB.

30. The computer system as described in claim 28, wherein said business ownership for a wireless subscriber is determined by accessing a Local Number Portability (LNP) database and a Local Exchange Routing Guide (LERG) database.

31. The computer system as described in claim 28, wherein said business ownership for a landline subscriber is determined by accessing a Line Information Database (LIDB).

32. The computer system as described in claim 28, wherein determining residential versus business status for a landline subscriber of said selected panel of numbers is determined by:

accessing a Calling Name Services (CNAM) database; and accessing the LNP database to determine residential versus business status when said status is absent from the CNAM database.

33. The computer system as described in claim 23 wherein said market information is obtained by sequentially accessing said plurality of databases, said plurality of databases comprising:

an ENUM (Telephone Number Mapping) database;

a Calling Name Services (CNAM) database; and an Internet Protocol (IP) Peering database.

34. A method of measuring market share for a telecommunication market, said method comprising:

selecting a telephone number (TN) from a panel of numbers for sampling a telephone network;

generating a signaling message for said TN;

sending said generated signaling message to a plurality of databases and to said TN;

receiving a response from a first one of said plurality of databases and said selected TN;

analyzing said received response from said first one of said plurality of databases and said selected TN wherein said analysis determines a first carrier associated with the TN;

querying a local number portability (LNP) database to identify a porting status of the TN; and associating the TN with a second carrier associated with the LNP when the TN is associated with a local routing number (LRN), or associating the TN with the first carrier when the query does not return the LRN.

35. The method as described in claim 34 wherein said panel of numbers are selected by accessing a Local Exchange Routing Guide (LERG) database.

36. The method as described in claim 34 wherein said panel of numbers are selected from a group consisting of wireless and landline numbers.

37. The method as described in claim 34 wherein said panel of numbers are selected randomly.

38. The method as described in claim 34 wherein said generated signaling message accesses said plurality of databases and wherein said plurality of databases comprises at least one of a Calling Name Services (CNAM) database,
a Local Number Portability (LNP) database,
a Line Information Database (LIDB),
an E-911 Automated Location Information (ALI) database,
an ENUM (Telephone Number Mapping) database or
an Internet Protocol (IP) Peering database.

39. The method as described in claim 38 wherein a signaling system 7 (SS7) protocol is used to access said CNAM, LNP, LIDB and E-911 ALI database.

40. The method as described in claim 38 wherein Internet Protocol (IP) is used to access said ENUM and IP Peering database.

41. The method as described in claim 34 wherein said received response from said plurality of databases and said selected panel of numbers is used to analyze said received response to determine a plurality of market share information, said plurality of market share information comprising:

determining assignment status information of said selected panel of numbers;

determining business ownership of said selected panel of numbers;

determining residential versus business status of said selected panel of numbers; and determining a technology used to provide service to said selected panel of numbers.

* * * * *